J. W. NORCROSS.
BLOCK SHEAVES.

No. 182,322. Patented Sept. 19, 1876.

WITNESSES,
C. P. Langworthy
R. W. Eaton

INVENTOR,
Joseph W Norcross
by Joseph A. Miller
ATTORNEY.

UNITED STATES PATENT OFFICE.

JOSEPH W. NORCROSS, OF BOSTON, MASSACHUSETTS.

IMPROVEMENT IN BLOCK-SHEAVES.

Specification forming part of Letters Patent No. 182,322, dated September 19, 1876; application filed June 20, 1876.

*To all whom it may concern:*

Be it known that I, JOSEPH W. NORCROSS, of the city of Boston, county of Suffolk and State of Massachusetts, have invented certain new and useful Improvements in Block-Sheaves; and I hereby declare that the following is a full, clear, and exact description of the same, reference being had to the accompanying drawings, forming part of this specification.

Figure 1:
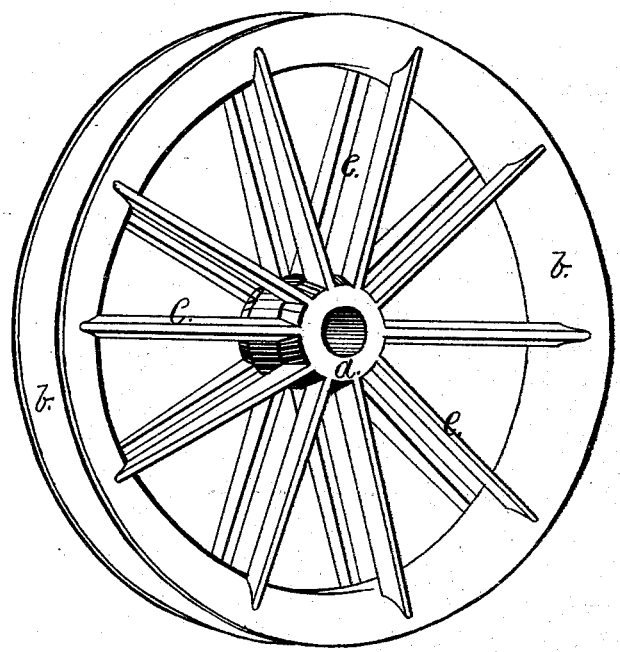
Figure 2:

Figure 1 is a perspective view of my improved block-sheave. Fig. 2 is a sectional view through the center of the same.

The object of this invention is to so arrange a cast-metal block-sheave that the same shall be as light or lighter than a lignum-vitæ sheave, and at the same time, as strong or stronger than the lignum-vitæ sheave, and more durable and cheaper.

The invention consists in casting a sheave with two sets of spokes extending from the hub to the concave rim, so that the spokes form braces arranged to sustain the sides of the concave rim, and thus strengthen the same, as will be more fully set forth hereinafter.

In the drawings, *a* is the hub; *b*, the concave rim, and *c c* are the spokes. The hub *a* is slightly longer than the width of the concave rim *b*, for the purpose of allowing the sheave to turn freely in the block. The spokes *c c* extend from the two ends of the hub, and, slanting inward, unite with the concaved rim, so as to form firm braces, one opposite the other, leaving the central portion of the rim free from direct strain, thus allowing the concaved rim to contract in cooling without placing the metal into tension, by which, in cold weather, or when receiving a sudden strain, the rim is liable to break, and the sheave made useless. When a heavy strain is put on a rope resting in a concaved rim of a sheave, the greater strain is on the outside portion of the rope, and this strain compresses the rope so that a great lateral pressure is exerted on the sides of the concave rim; and in cast-metal sheaves, as heretofore constructed, the sides of the concave rim frequently break off, and when so broken the sheave becomes dangerous—first, because the pieces pressed out are liable to bind the sheave and prevent its rotation in the block; and, second, the sharp edges are liable to cut the rope.

In my improved block-sheave the sides of the concave rim are supported and strengthened by the spokes *c c*, which are for that purpose arranged so as to brace inward from the hub toward the sides of the concave rim. The rim is not liable to give way under the severest strain on the rope.

By this arrangement the strain is more evenly distributed than when the spokes are arranged alternately on one side of the concave and the other. The metal is also more evenly distributed, and the sheave can be more uniformly annealed.

The sheave is stronger, more durable, and lighter than a lignum-vitæ sheave of the same dimensions, and can be made at a greatly-reduced cost.

Having thus described my invention, I claim as new and desire to secure by Letters Patent—

1. As a new article of manufacture, a block-sheave, in which the concave rim is connected with the hub by two sets of spokes inclined inward, and set one opposite the other, substantially as and for the purpose described.

2. The combination, with the hub *a* and concave rim *b*, of the spokes *c c*, extending from the outer edge of the hub, and inclining inward, connecting with the sides of the concave rim, leaving the central portion of the concave rim unsupported, and arranged so as to have the spokes placed opposite one to another, substantially as and for the purpose set forth.

JOSEPH W. NORCROSS.

Witnesses:
JOSEPH A. MILLER,
HORACE F. HORTON.